(12) United States Patent
Baggett et al.

(10) Patent No.: US 11,775,045 B2
(45) Date of Patent: Oct. 3, 2023

(54) MANAGING POWER AT A STATION VIA A PHYSICAL LAYER DEVICE AND RELATED SYSTEMS, METHODS AND DEVICES

(71) Applicant: Microchip Technology Incorporated, Chandler, AZ (US)

(72) Inventors: William T. Baggett, Austin, TX (US); Venkatraman Iyer, Austin, TX (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 16/781,227

(22) Filed: Feb. 4, 2020

(65) Prior Publication Data

US 2020/0393891 A1 Dec. 17, 2020

Related U.S. Application Data

(60) Provisional application No. 62/861,226, filed on Jun. 13, 2019.

(51) Int. Cl.
*G06F 1/3234* (2019.01)
*G06F 13/20* (2006.01)

(52) U.S. Cl.
CPC ............ *G06F 1/3234* (2013.01); *G06F 13/20* (2013.01); *G06F 2213/40* (2013.01)

(58) Field of Classification Search
CPC .... G06F 1/3209; G06F 1/3203; G06F 1/3296; G06F 1/3234; G06F 1/3293; G06F 1/26; G06F 1/263; G06F 1/3287
See application file for complete search history.

(56) References Cited

U.S. PATENT DOCUMENTS

| | | | |
|---|---|---|---|
| 5,216,286 A * | 6/1993 | Peterson | H02J 9/061 307/64 |
| 7,478,251 B1 * | 1/2009 | Diab | G06F 1/189 713/300 |
| 8,504,215 B1 * | 8/2013 | McCorkendale | H02J 3/14 700/295 |
| 8,799,633 B2 | 8/2014 | Suganami | |
| 10,097,034 B2 * | 10/2018 | Hsieh | G01R 31/382 |
| 2004/0010725 A1 * | 1/2004 | Chan | H02J 9/061 713/300 |
| 2005/0215274 A1 * | 9/2005 | Matson | H04W 52/0235 455/522 |
| 2006/0143583 A1 * | 6/2006 | Diab | G06F 1/3209 713/300 |

(Continued)

FOREIGN PATENT DOCUMENTS

EP 2254279 A2 11/2010

OTHER PUBLICATIONS

Pimentel, Ross; DP83822 Low Power Modes, Application Report ANLA260—Aug. 2016, Texas Instruments, pp. 1-4, www.it.com.

(Continued)

*Primary Examiner* — Raymond N Phan
(74) *Attorney, Agent, or Firm* — TraskBritt

(57) ABSTRACT

Described is an architecture for a physical layer device useable with single pair Ethernet in a multidrop bus topology that may operate in a sleep mode and control other devices in network segment to operate in a sleep mode. Some embodiments of the physical layer device may support partial networking in a multidrop network, and mixed networks including the same.

25 Claims, 10 Drawing Sheets

(56) References Cited

U.S. PATENT DOCUMENTS

| | | | |
|---|---|---|---|
| 2006/0186739 A1* | 8/2006 | Grolnic | H04L 12/10 307/64 |
| 2007/0230484 A1 | 10/2007 | Hu et al. | |
| 2012/0042181 A1* | 2/2012 | Kuo | G06F 1/263 713/300 |
| 2013/0039663 A1* | 2/2013 | LaBounty | G01R 19/2506 398/116 |
| 2013/0169421 A1* | 7/2013 | Murase | H04L 12/40045 340/13.23 |
| 2013/0184891 A1* | 7/2013 | Etaati | G06F 1/30 700/295 |
| 2014/0047255 A1* | 2/2014 | Sasaki | H04L 12/40 713/323 |
| 2014/0307281 A1 | 10/2014 | Park | |
| 2016/0011650 A1* | 1/2016 | Yang | G06F 1/3206 713/323 |
| 2016/0337138 A1* | 11/2016 | Gardner | H04L 12/10 |
| 2017/0080861 A1* | 3/2017 | Vora | B60R 1/00 |
| 2017/0117734 A1* | 4/2017 | Lai | H02J 9/061 |
| 2018/0351765 A1 | 12/2018 | Aarey Premanath et al. | |
| 2019/0179398 A1* | 6/2019 | Arora | G06F 1/3209 |
| 2019/0357146 A1* | 11/2019 | Kim | H04W 52/0274 |
| 2020/0044874 A1* | 2/2020 | Xu | G06F 1/3209 |

OTHER PUBLICATIONS

International Search Report from International Application No. PCT/US2020/016645, dated May 4, 2020, 5 pages.

International Written Opinion from International Application No. PCT/US2020/016645, dated May 4, 2020, 9 pages.

\* cited by examiner

MANAGING POWER AT A STATION VIA A PHYSICAL LAYER DEVICE AND RELATED SYSTEMS, METHODS AND DEVICES

CROSS-REFERENCE TO RELATED APPLICATIONS

This application claims the benefit of the priority date of U.S. Provisional Patent Application No. 62/861,226, filed Jun. 13, 2019, and titled "PHYSICAL LAYER DEVICE WITH SLEEP MODE AND PARTIAL NETWORKING SUPPORT AND RELATED SYSTEMS, METHODS AND DEVICES" the disclosure and contents of which is incorporated herein in its entirety by this reference.

TECHNICAL FIELD

Embodiments described herein relate, generally, to network segments used for single pair Ethernet, and more specifically, network segments configured as a multidrop network segment. Some embodiments relate to physical layer devices with sleep mode and partial network networking support. Some embodiments relate to stations coupled to network segments of networks.

BACKGROUND

Interconnects are widely used to facilitate communication among devices of a network. Generally speaking, electrical signals are transmitted on a physical medium (e.g., a bus, a coaxial cable, differential pair, a twisted pair, or other pair of conductors—and sometimes referred to simply as a "line") by the devices coupled to the physical medium.

According to the Open Systems Interconnection model (OSI model), Ethernet-based computer networking technologies use baseband transmission (i.e., electrical signals as discrete electrical pulses) to transmit data packets and ultimately messages that are communicated among network devices. According to the OSI model, specialized circuitry called a physical layer (PHY) device or controller is used to interface between an analog domain of a line and a digital domain of a data link layer (or just "link layer") that operates according to packet signaling. While a data link layer may include one or more sublayers, in Ethernet-based computer networking, a data link layer typically includes at least a media access control (MAC) layer that provides control abstraction of the physical layer. By way of example, when transmitting data to another device on a network, a MAC controller may prepare frames for the physical medium, add error correction elements, and implement collision avoidance. Further, when receiving data from another device, a MAC controller may ensure integrity of received data and prepare frames for higher layers.

There are various network topologies that implement physical layers and link layers (and may include other layers, without limitation). The Peripheral Component interconnect (PCI) standard and the Parallel Advanced Technology Attachment (Parallel ATA), both around since the early 1990's, may implement a multidrop bus topology. The trend since the early 2000's has been to use point-to-point bus topologies, for example, the PCI Express standard and the Serial ATA (SATA) standard implement point-to-point topologies.

A typical point-to-point bus topology may implement lines between each device (e.g., dedicated point-to-point) or lines between devices and switches (e.g., switched point-to-point, without limitation). In a multidrop topology, a physical medium is a shared bus and each network device is coupled to the shared bus, for example, via a circuit chosen based on the type of physical medium (e.g., coaxial, twisted pair, differential pair, or other pair of conductors, without limitation).

Point-to-point bus topologies, such as a dedicated point-to-point topology or a switched point-to-point topology, require more wires and more expensive material than multidrop topologies due, in part, to the greater number of links between devices. In certain applications, such as automotive and industrial, there may be physical constraints that make it difficult to directly connect devices, and so a topology that does not require, or does not require as many, direct connections (e.g., a multidrop bus topology, without limitation) in a network or a sub-network may be less susceptible to such constraints.

Devices that are on a baseband network (e.g., a multidrop network without limitation) share the same physical transmission medium, and typically use the entire bandwidth of that medium for transmission (stated another way, a digital signal used in baseband transmission occupies the entire bandwidth of the media). As a result, only one device on a baseband network may transmit at a given instant.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
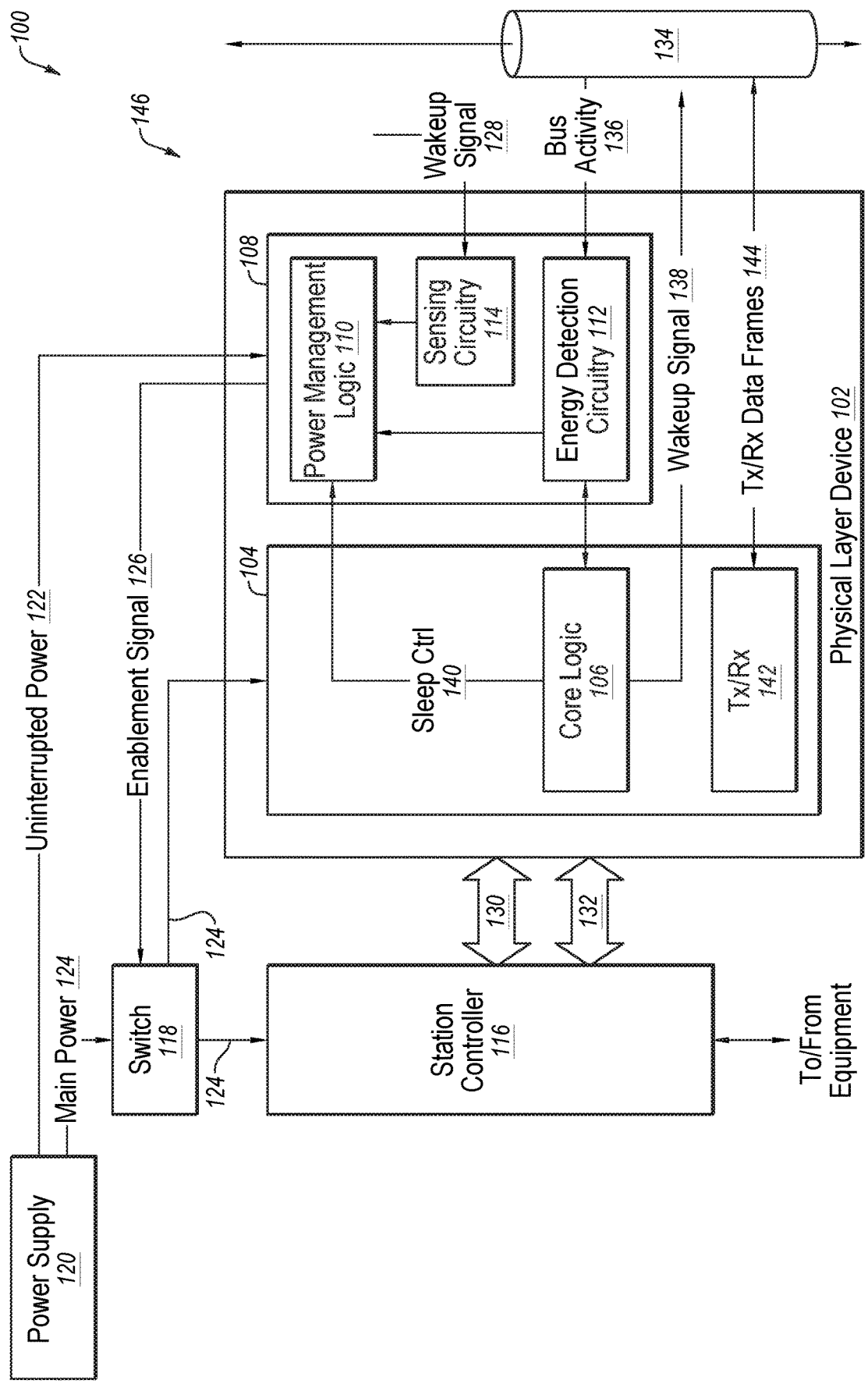
FIG. 1 illustrates a station in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of some embodiments is not intended to limit the scope of the present disclosure, but is merely representative of some embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

A vehicle, such as an automobile, a truck, a bus, a ship, and/or an aircraft, may include a vehicle communication network. The complexity of a vehicle communication network may vary depending on a number of electronic devices and subsystems within the network. For example, an advanced vehicle communication network may include various control modules for, for example, engine control, transmission control, safety control (e.g., antilock braking), and emissions control. As another non-limiting example, an advanced vehicle communication network may include modules for supporting audio and other information and entertainment systems, on board charging, exterior cameras, connectivity for external devices (e.g., universal serial bus connectivity) and door control (e.g., locks, windows, side-view mirrors), and automobile diagnostics, without limitation. Similar considerations arise for communication networks used in industrial controls, building operations systems, building management systems, residential utility systems, connected lighting systems, and control and sensor networks more generally, without limitation.

To support these modules, the automotive industry relies on various communication protocols. 10SPE (i.e., 10 Mbps Single Pair Ethernet) is a network technology specification under development by the Institute of Electrical and Electronics Engineers (IEEE) as IEEE Std 802.3cg™-2020. 10SPE may be used to provide a collision free, bounded latency (e.g., an upper bound on how long a packet will be delayed before transmission, without limitation) transmission on a multidrop bus of a network. While the present draft 10SPE specification provides for PHY requirements for normal operation, there are no requirements for lower power or sleep modes (low power modes, power saving modes, and sleep modes are collectively referred to herein as "sleep mode(s)").

As used herein, "wake" and "waking" mean transitioning from a sleep mode to an awake mode.

Some embodiments relate, generally, to a PHY for a network segment for Ethernet communication, such as a network segment (including without limitation a mixing segment) of a multidrop network, without limitation. In such embodiments, a PHY is configured to automatically and/or selectively enter and exit a sleep mode as described herein. More generally, a network segment including embodiments of such a PHY may also automatically and/or selectively enter and exit a sleep mode.

FIG. 1 depicts a block diagram of a station 100, in accordance with one or more embodiments. In the embodiment depicted by FIG. 1, station 100 includes station controller 116 in communication with network segment 146, which network segment 146 includes physical layer device 102, shared bus 134 and devices and connections there between. More specifically, station controller 116 communicates with physical layer device 102 via management interface 130 (e.g., a management data input/output (MDIO) interface, without limitation) and data interface 132 (e.g., a media independent interface (MII) without limitation). Station controller 116 is also in communication with shared bus 134 via physical layer device 102, which physical layer device 102 may be understood to operate as an interface between station controller 116 and shared bus 134. While not shown, the embodiment of station 100 shown in FIG. 1 contemplates station controller 116 including a media access controller (MAC) for communication with physical layer device 102 via management interface 130 and data interface 132. In other embodiments of station 100, a MAC may be part of the same device as physical layer device 102, a separate device from physical layer device 102 or station controller 116, and combinations thereof, without limitation.

As non-limiting examples, station controller 116 may be implemented by one or more of a general-purpose processor, a microprocessor, any conventional processor, a controller, a microcontroller, and a state machine configured to perform one or more of the functions or features of a station controller discussed herein. Station controllers of disclosed embodiments (e.g., station controller 116, without limitation) should be understood to include stations for Ethernet networking but is not limited thereto and may include other network node controllers.

In the context of this disclosure, shared bus 134 is optional and not necessarily part of station 100, but is shown in FIG. 1 for ease of description of the operation of station 100 as well as to show network segment 146, which includes physical layer device 102 and shared bus 134. In some cases, network segment may be understood to include a shared bus and all of the physical layer devices (e.g., physical layer devices 102, without limitation) operatively coupled to it. In such cases, network segment 146 may be understood to be a network segment portion 146 of a network segment that includes other network segment portions 146.

Not all stations 100 of a network segment 146 may be necessary in the context of the operation of a specific application. If one or more stations 100 of a network segment 146 are not necessary for some portion of time, it may be desirable to power down one or more of those stations 100 to conserve system power consumption. Within the automotive context, disabling rear object sensing systems while not traveling in reverse, and disabling driver parking assist features while traveling on a highway, are non-limiting examples of such a desirable power down to conserve system power consumption. In one or more embodiments, station controller 116 may be configured to control equipment of a node associated with a network segment 146, including without limitation controlling power consumption in the aforementioned examples and other applications.

Physical layer device 102 is configured for at least two power domains, main power domain 104 and uninterrupted power domain 108. Core logic 106, which is responsible for core operations of physical layer device 102 (e.g., one or more of transmitting and receiving data to, and from, shared bus 134 (e.g., via transmission/reception circuitry denoted as Tx/Rx 142 in FIG. 1) as well as to, and from, station controller 116, collision avoidance, and traffic shaping, without limitation) is part of main power domain 104. Power management logic 110, sensing circuitry 114, and energy detection circuitry 112 are part of uninterrupted power domain 108. Notably, main power domain 104 and uninterrupted power domain 108 may include additional circuits than those shown in FIG. 1.

Main power domain 104 (and elements that are part of it) is supplied main power 124 from power supply 120. Notably, supply of main power 124 to main power domain 104 is interruptible. In the embodiment shown in FIG. 1, switch 118 is located on the path of main power 124 to main power domain 104 of physical layer device 102. Specifically, switch 118 is located between power supply 120 and main power domain 104 on the path of main power 124.

Station controller 116 is also supplied main power 124 by power supply 120 and switch 118. Station controller 116, elements of main power domain 104 of physical layer device 102, and yet other devices, chips, cards, and equipment that are not shown in FIG. 1, may be understood to be part of a main power domain of station 100. In the context of station 100, enabling/disabling supply of power to main power domain 104 should be understood to include enabling/disabling power to the main power domain of station 100 more generally.

While one or more outputs of switch 118 are turned 'off,' switch 118 does not provide a path for main power 124 to be received at main power domain 104 (and station controller 116, which in the embodiment shown in FIG. 1 is also supplied by main power 124 via a respective output of switch 118). While one or more outputs of switch 118 are turned 'on' then switch 118 provides a path for main power 124 to be received at main power domain 104 and/or station controller 116. While switch 118 is off, management interface 130 and data interface 132 between station controller 116 and physical layer device 102 are inactive. In some embodiments, portions of station controller 116 may be powered while one or more outputs of switch 118 are turned off via one or more other power paths (not shown).

In disclosed embodiments, switch 118 may be any suitable switching technology known to one of ordinary skill in the art for interrupting current flow. As non-limiting examples, switch 118 may be an analog switch, a digital switch, and combinations thereof, without limitation. In the embodiment shown in FIG. 1, switch 118 is controlled (i.e., turned on and/or off) in response to enablement signal 126 provided by power management logic 110, as described more fully below. In this manner, power management logic 110 may enable and/or disable supply of power to main power domain 104 (main power domain 104 is also characterizable as an "interruptible power domain").

Uninterrupted power domain 108, and the elements that are part of it, is supplied by uninterrupted power 122 from power supply 120. Stated another way, the path of uninterrupted power 122 from power supply 120 to uninterrupted power domain 108 is not interruptible. As a non-limiting example, while switch 118 is turned off, uninterrupted power 122 still is supplied to uninterrupted power domain 108. So, in physical layer device 102, power may be supplied to uninterrupted power domain 108 while no power (or insufficient power) is supplied to main power domain 104.

Notably, uninterrupted power 122 and main power 124 may operate at the same (i.e., substantially the same) or different voltage levels. Moreover, while not shown in FIG. 1, in some embodiments, voltage regulators, protection circuitry, and other electrical components may be added to the path of main power 124 and/or uninterrupted power 122, as non-limiting examples, to protect station 100 from an unreliable power source or to supply power to inputs of station controller 116 and/or physical layer device 102 where the inputs operate at different voltages.

Power supply 120 may be, or be supplied by, any suitable regulated or unregulated power source, and combinations thereof. As non-limiting examples, power supply 120 may be a generator, a battery, or power supplied by a utility (e.g., to a residential or commercial building, without limitation).

In FIG. 1, power supply 120 is shown supplying power to both main power domain 104 and uninterrupted power domain 108, however, a common power supply is not necessarily required. In some embodiments, main power domain 104 and uninterrupted power domain 108 may be supplied by different power sources and/or power supplies. As a non-limiting example, main power domain 104 may be supplied by a generator and uninterrupted power domain 108 may be supplied by a battery; and optionally, the battery supplying the uninterrupted power domain 108 may store power received from the same generator supplying main power domain 104 or from a different generator.

Power management logic 110 is configured, generally, to control supply of main power 124 to main power domain 104 and station controller 116, and more specifically, to turn on and off switch 118 by asserting/de-asserting enablement signal 126. In a contemplated operation consistent with a "positive logic" convention a de-asserted enablement signal 126 turns 'off' switch 118 and main power 124 is not provided to devices, including without limitation station controller 116 and/or main power domain 104; and an asserted enablement signal 126 turns 'on' switch 118 and main power 124 is provided to devices, including without limitation station controller 116 and/or main power domain 104. Other conventions may be used, including without limitation a "negative logic" convention. Power management logic 110 may be configured to de-assert enablement signal 126 to switch 118 in response to detected inactivity at shared bus 134 and/or in response to a de-asserted wakeup signal 128, as indicated to power management logic 110 by energy detection circuitry 112 and sensing circuitry 114, respectively. Moreover, power management logic 110 may be configured to assert enablement signal 126 to switch 118 in response to detected bus activity 136 at shared bus 134 or detecting an asserted wakeup signal 128.

Additionally, or alternatively, power management logic 110 may be configured to de-assert enablement signal 126 in response to an instruction from core logic 106, e.g., sleep control signal 140 from core logic 106 to power management logic 110 shown in FIG. 1. As a non-limiting example, core logic 106 may be configured to set a power control bit of a control register of power management logic 110 (not separately shown), and power management logic 110 may be configured to de-assert enablement signal 126 in response to the power control bit being set at such a control register.

Sensing circuitry 114 may be configured, generally, to observe/detect wakeup signal 128 and, in response to observing/detecting wakeup signal 128, notify power management logic 110 that a wakeup signal was observed/detected. As a non-limiting example, physical layer device 102 may include an input, and sensing circuitry 114 may be configured to notify power management logic 110 that a valid signal (e.g., a wakeup signal 128) was asserted at the assigned input.

In one embodiment, energy detection circuitry 112 may be configured, generally, to observe/detect a signal indicative of valid bus activity and/or a signal indicative of bus inactivity at shared bus 134, and more specifically, to detect if an energy level (e.g., a signal amplitude or voltage level, without limitation) of bus activity 136 is above or below a specified threshold. As a non-limiting example, an energy level below a first threshold may be indicative of shared bus 134 being inactive. As another non-limiting example, energy above the first threshold may be indicative of shared bus 134 being active (i.e., a signal on the shared bus 134 corresponds to valid bus activity such as an Ethernet data frame, without limitation). In this manner, energy detection circuitry 112 may also be characterized as an activity/inactivity detection circuit.

In another embodiment, energy detection circuitry 112 may be configured, generally, to measure an energy level of bus activity 136 and provide a value indicative of a measured energy level to power management logic 110. In some embodiments, energy detection circuitry 112 may be configured to provide the value to the power management logic 110, which may be accumulated over a period of time, and the length of the period of time may be associated with a valid signal to distinguish between intentional activity at the shared bus and noise at the shared bus.

Power management logic 110 may be configured to de-assert enablement signal 126 in response to a value received from energy detection circuitry 112 being below a specified inactivity threshold, and may be configured to assert enablement signal 126 in response to a value received from energy detection circuitry 112 being above a specified activity threshold. Additionally, or alternatively, power management logic 110 may be configured to de-assert enablement signal 126 in response to a value received from energy detection circuitry 112 being below a specified inactivity threshold.

In one or more embodiments, thresholds used for determining activity and/or inactivity may be specified in accordance with energy levels associated with Ethernet signals. More specifically, in one or more embodiments, an inactivity threshold may be specified as one or more energy levels below or above energy levels associated with Ethernet signals or other valid communication signals (stated another way, outside a range of energy levels associated with Ethernet signals), and an activity threshold may be specified as one or more energy levels within a range of energy levels associated with Ethernet signals or other valid communication signals (e.g., equal to energy levels used to communicate Ethernet frames on the network, without limitation).

As discussed herein, multiple stations and/or network segments may be placed into a sleep mode by forcing a network (e.g., forcing a transmission medium, without limitation) to be inactive and/or by providing a signal that is above a threshold used to communicate data on the network (e.g., greater than used to communicate Ethernet frames).

In disclosed embodiments, energy detection circuitry 112 may be configured to perform energy detection using any suitable technique for detecting that shared bus 134 is active or inactive known to one of ordinary skill in the art.

In some embodiments, station controller 116 may be configured to perform a power-on reset or other reset operation of station 100 if main power 124 is interrupted and then later restored (i.e., supplied) to station controller 116. For example, if station 100 is not operating correctly, for example, has not communicated on shared bus 134 for a predetermined period of time, or is not sending data or beacons when expected, then a master device (not shown) that detects this abnormal behavior may assert a sleep signal (not shown) at physical layer device 102 to cause station controller 116 to power-off and then assert wakeup signal 128 to power-on and thereby perform its (i.e., station controller 116) power on reset routine, which may result in correcting the abnormal behavior at station 100.

In some embodiments, physical layer device 102 may be configured for selective propagation of one or more of wakeup signal 128 to an output of physical layer device 102. In one embodiment, physical layer device 102 may include one or more outputs for operable coupling (e.g., by a link) to one or more inputs of another physical layer device, where the inputs of the other physical layer device are for wakeup signals or sleep signals (sleep signals not shown). In one embodiment, power management logic 110 may be configured to assert wakeup signal 138, including without limitation in response to asserting enablement signal 126. As a non-limiting example, power management logic 110 may be configured to assert wakeup signal 138 responsive to being configured for daisy chained operation as described herein. Notably, embodiments of physical layer device 102 configured for daisy chained operation and embodiments of physical layer device 102 that are not configured for daisy chained operation are specifically contemplated by this disclosure.

From the perspective of a device (e.g., a microcontroller or embedded system, without limitation) configured as physical layer device 102, wakeup signal 128 may be characterized as a wakeup input signal (e.g., a signal seen at an input of the device, the input being associated with a wakeup signal 128), and wakeup signal 138 may be characterized as a wakeup output signal (e.g., a signal seen at an output of the device, the output being associated with a wakeup signal 138).

Many benefits, advantages and use cases will be appreciated by one of ordinary skill in the art for a physical layer device for a multidrop network that has two ways to exit sleep mode and two ways to enter sleep mode. Design considerations and application constraints, as non-limiting examples, may necessitate a physical layer device that has one way to enter sleep mode and two ways to be woken up, two ways to enter sleep mode and one way to be woken up, and one way to enter sleep mode and one way to be woken up, and such embodiments are specifically contemplated by this disclosure.

Figure 2:
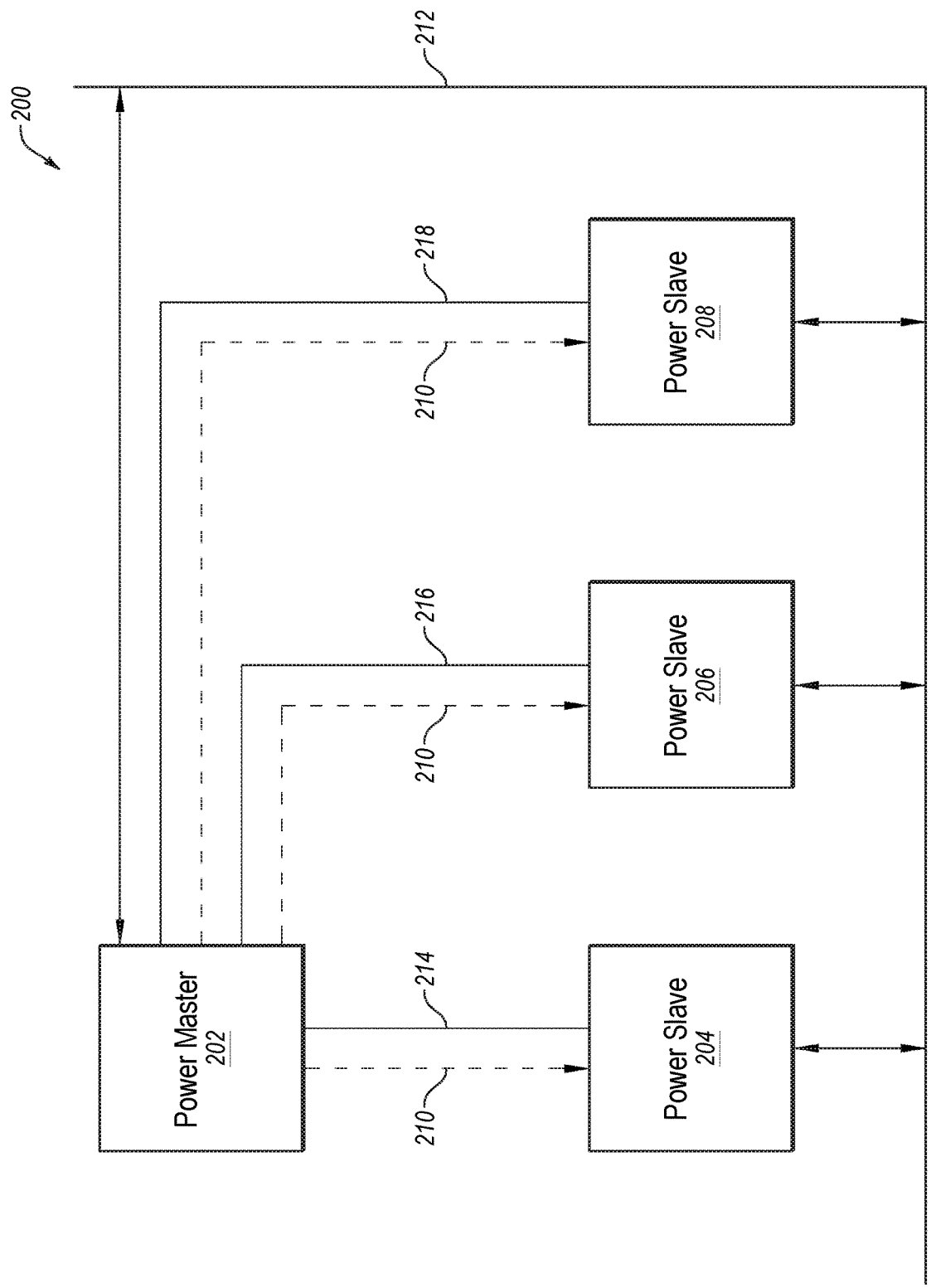
FIG. 2 illustrates a first use case of a network in accordance with one or more embodiments.
Figure 3:
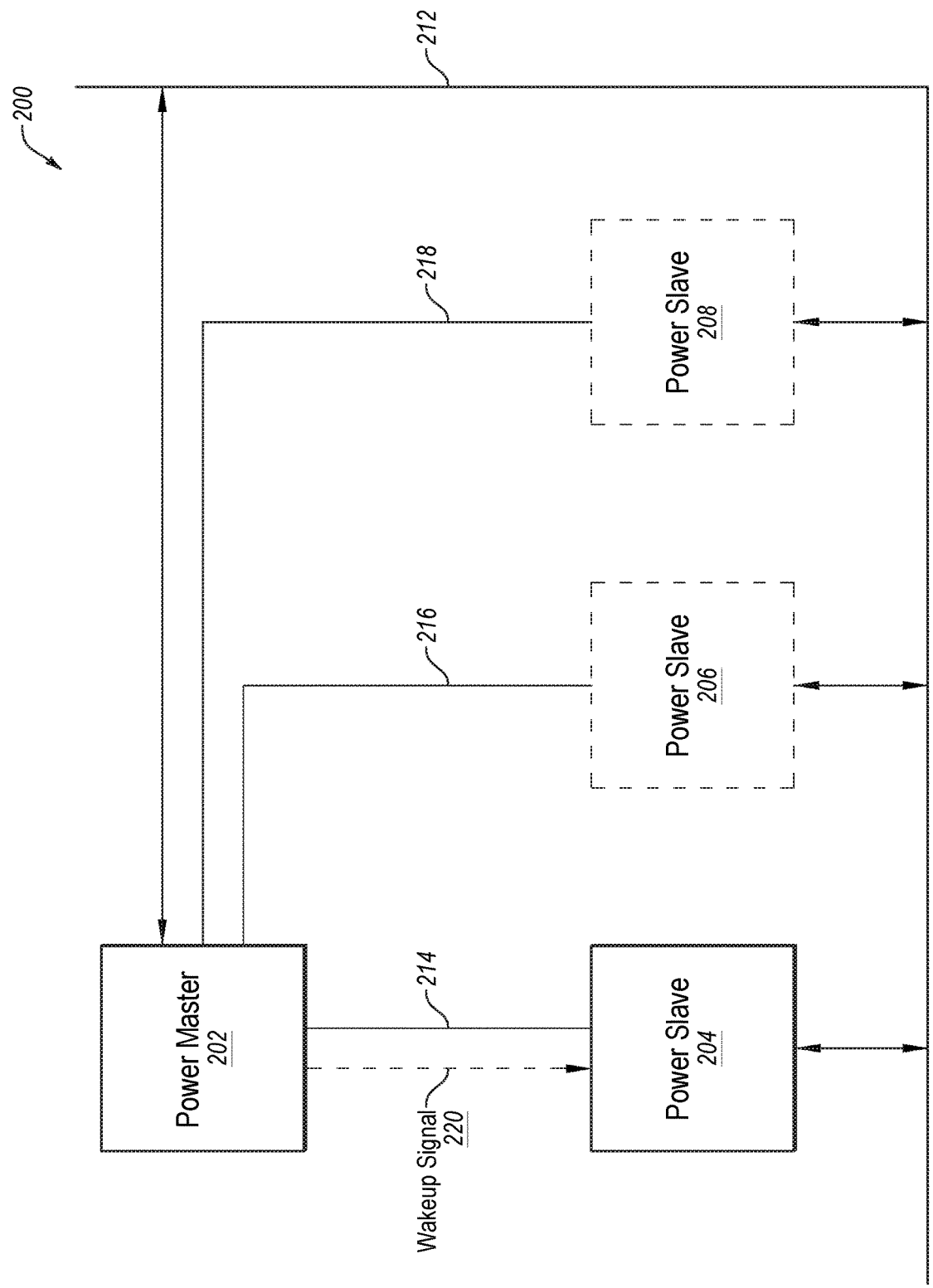
FIG. 3 illustrates a second use case of a network in accordance with one or more embodiments.
Figure 4:
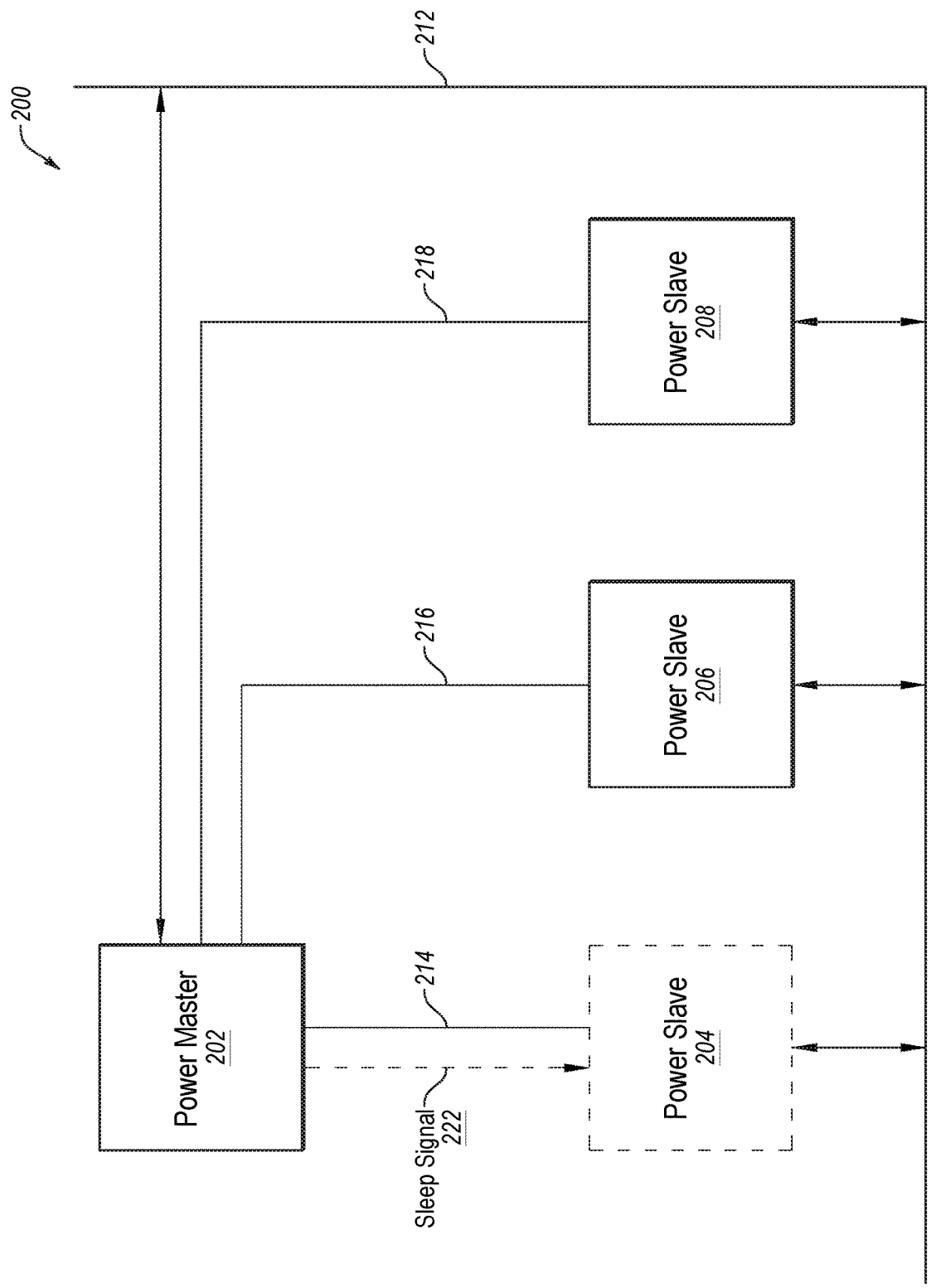
FIG. 4 illustrates a third use case of a network in accordance with one or more embodiments.

FIG. 2, FIG. 3, and FIG. 4 show block diagrams of a network 200 configured as a multidrop network in accordance with one or more embodiments. As discussed below, the embodiment of network 200 depicted in FIG. 2 and FIG. 3 is configured, generally, for partial networking, and illustrates a use case for a physical layer device 102, network segment 146 and a station 100 of FIG. 1 more generally.

Network 200 may include power master 202, power slave 204, power slave 206, and power slave 208, which are in communication over one or more buses and wired connections, including, without limitation, shared bus 212 (e.g., configured as a multidrop bus) and wired connections 214, 216 and 218. Each of power slave 204, power slave 206 and power slave 208 is configured as a station 100. In some embodiments, power master 202 may be, or be configured as, a station 100, a networking switch, or a dedicated power control device for a multidrop network or a mixing segment of a network, without limitation. Power master 202 may be configured, generally, to perform one or more operations for implementing partial networking as discussed herein.

Network 200, and more specifically power slaves 204, 206 and 208, may be configured to enter/exit a sleep mode in response to power control signals 210 provided by power master 202 to power slave 204, 206 and 208 over shared bus 212 or over wired connections 214, 216 and 218. Additionally, or alternatively, network 200 and power slaves 204, 206 and 208 may be configured to enter/exit a sleep mode in response to activity levels of shared bus 212, including in response to power control signals 210 asserted at shared bus 212 by power master 202 and/or data frames transmitted by various networked devices. In some embodiments, power control signals 210 may include wakeup signals (e.g., wakeup signal 220 of FIG. 3, without limitation) and sleep signals (e.g., sleep signal 222, without limitation). In some embodiments power control signals 210 may include signals asserted by power master 202 to represent valid bus activity (e.g., signals exhibiting energy levels associated with communication messages conveyed over network 200 such as Ethernet data frames, without limitation) or invalid bus activity (e.g., signals exhibit energy levels different than energy levels associated with communication messages conveyed over network 200 such as Ethernet frames, without limitation) at shared bus 212.

In a contemplated operation of network 200, power master 202 provides power control signals 210 to power slave 204, power slave 206 and power slave 208. In response to power control signals 210 respective node controllers (e.g., station controller 116 of FIG. 1) of one or more of power slave 204, power slave 206, and power slave 208 may instruct respective power management logic (e.g., power management logic 110 of FIG. 1) to supply power or interrupt power, as the case may be—thereby causing such node to enter a sleep mode or enter an awake mode.

In some embodiments, power control signals 210 may include digital signals that comprise high and low voltages that represent logic values 1 and 0, respectively.

In another contemplated operation, one or more of power slave 204, power slave 206 and power slave 208 may enter a sleep mode in response to detecting that shared bus 212 is inactive (e.g., bus activity 136 is below or above a threshold associated with valid bus activity, without limitation). In some cases, power master 202 may control signal levels at shared bus 212 such that the signal levels do not correspond to valid bus activity. In other cases, there may be no activity at shared bus 212 because of a particular operation in connection with a specific application of network 200. Similarly, one or more of power slave 204, power slave 206, and power slave 208 may enter an awake mode in response to detecting valid bus activity at shared bus 212 (e.g., bus activity 136 that is associated with valid activity, such as a specified threshold or Ethernet signals, without limitation). In some cases, power master 202 may control signal levels at shared bus 212 such that the signal levels correspond to valid bus activity. In other cases, there may be valid bus activity at shared bus 212, as a non-limiting example, due to communication of data frames over the bus.

FIG. 3 illustrates a use case of network 200 in accordance with one or more embodiments. In an operation contemplated by FIG. 3, power slave 204, power slave 206, and power slave 208 have been placed in a sleep mode by power master 202 or entered a sleep mode in response to detecting an inactive shared bus 212.

Power master 202 provides wakeup signal 220 to power slave 204 in order to wakeup power slave 204. In some embodiments, wakeup signal 220 may be communicated from power master 202 to power slave 204 over a communication path that includes, as non-limiting examples, one or more of shared bus 212 and wired connection 214. As non-limiting examples, wired connection 214 may be a control bus physically separate from shared bus 212 (e.g., a wiring, a controller area network (CAN) bus or a local interconnect network (LIN) bus, without limitation), and/or a combination thereof.

In response to wakeup signal 220, power slave 204 exits sleep mode (as indicated in FIG. 3 by a solid black outline of power slave 204) while power slave 206 and power slave 208 remain in sleep mode (as indicated in FIG. 3 by a dashed outline of power slave 206 and power slave 208).

FIG. 4 illustrates another use case of network 200 in accordance with one or more embodiments. In the operation contemplated by FIG. 4, power slave 204, power slave 206, and power slave 208 begin in an operating power mode (i.e., not in a sleep mode, also referred to herein as an "awake" mode). Power master 202 asserts sleep signal 222 at power slave 204 to instruct power slave 204 to enter sleep mode.

In some embodiments, sleep signal 222 may be an analog signal received at a PHY device of power slave 204, or a digital signal carrying a command to a node controller of power slave 204 to instruct the PHY device to put power slave 204 into sleep mode. Sleep signal 222 may be provided over a control bus physically separate from shared bus 212 (e.g., a wiring, a controller area network (CAN) bus or a local interconnect network (LIN) bus, without limitation), and/or a combination thereof. Turning back to FIG. 1, a sleep indication in sleep signal 222 may correspond to one of two logic levels of a digital signal (e.g., correspond to a logic '0' or a logic '1'). Moreover, a wake indication in wakeup signal 128 and/or wakeup signal 138 may correspond to the other of the two logic levels of a digital signal. In a case of analog communication via a direct connection from power master 202 to power slave 204, a wakeup signal may correspond to a high signal (e.g., 3 Volts, without limitation) and sleep signal 222 may correspond to a low signal.

In some embodiments, a sleep signal may be provided by network 200 as a higher level protocol command that is received by a node controller of power slave 204, and the station controller 116 of power slave 204 may instruct (e.g., by setting a sleep bit of a power management control register, not shown, without limitation) power management logic 110 to put power slave 204 of power slave 204 into a sleep mode by asserting sleep signal 222.

In response to sleep signal 222, power slave 204 enters a sleep mode (as indicated in FIG. 4 by a dashed outline), and power slave 206 and power slave 208 stay in an operating power mode (as indicated in FIG. 4 by a solid outline). Notably, in cases where power slave 204 should remain in a sleep mode, power master 202 may continue to assert sleep signal 222 otherwise activity on shared bus 212 (e.g., between power slave 206 and power slave 208) could wake up power slave 204.

In the manner discussed with reference to FIG. 3 and FIG. 4, power master 202 may use wakeup signal 220 to selectively cause a power slave of network 200 to exit a sleep mode while one or more other power slaves of the network remain in a sleep mode, and may use sleep signal 222 to selectively cause a power slave to enter a sleep mode while one or more other power slaves of the network are awake. Stated another way, network 200 is configured such that a portion of the network may be awake while another portion of the network is asleep.

Figure 5:
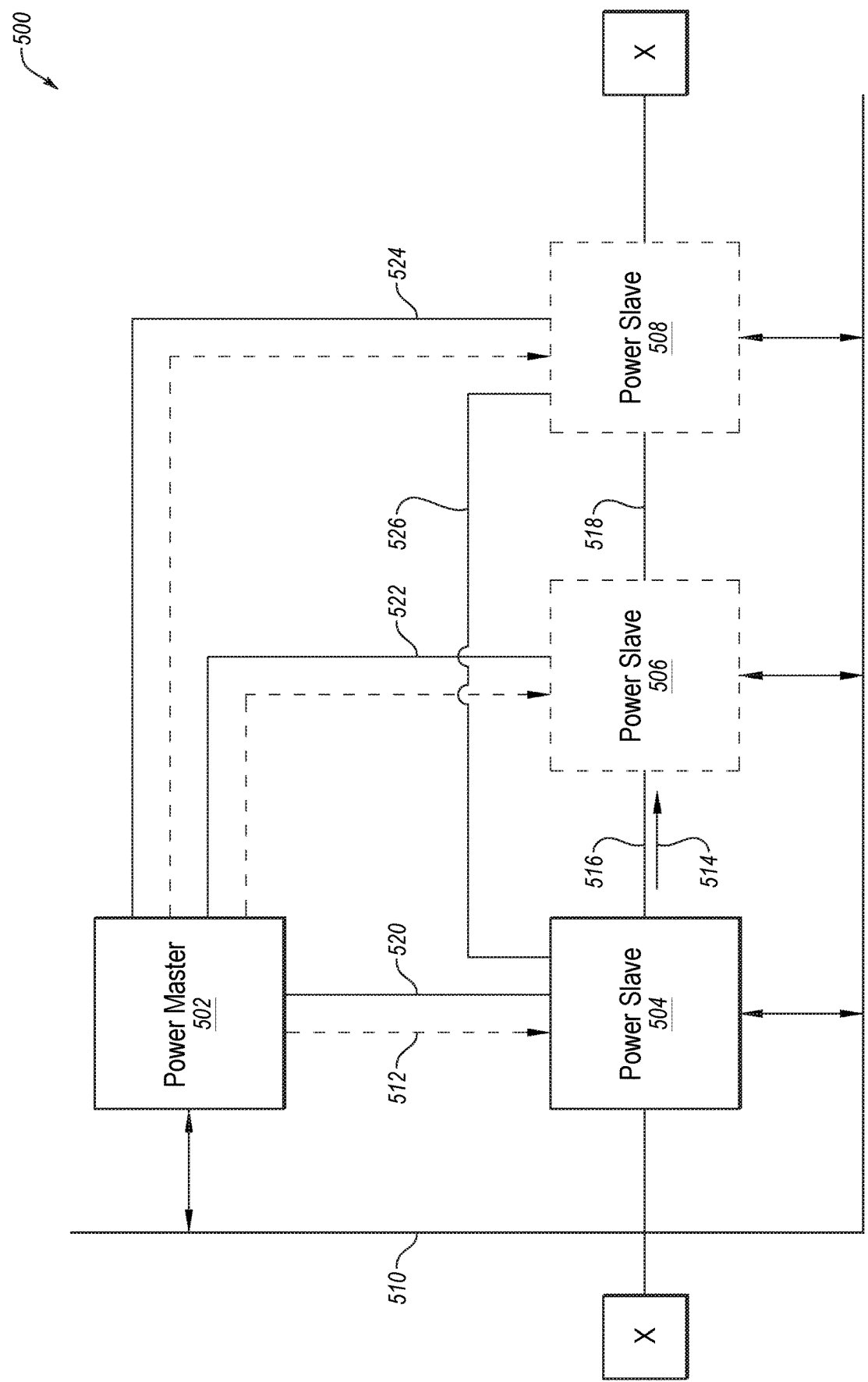
FIG. 5 illustrates a network with daisy chained power slave devices in accordance with one or more embodiments.

FIG. 5 shows a block diagram of an embodiment of a network 500 where power slave devices operatively coupled to shared bus 510 are daisy chained to each other, in accordance with one or more embodiments. More specifically, an output of power slave 504 is operatively coupled (by wired connection 516) to an input of power slave 506 monitored for wakeup signals, and an output of power slave 506 is operatively coupled (by wired connection 518) to an input of power slave 508 monitored for wakeup signals. Power master 502 is operably connected to each of power slave 504, 506 and 508 by respective connections 520, 522 and 524.

In some embodiments, wakeup signal 514 (and wakeup signal 138 of FIG. 1) may be communicated from power slave 504 to power slave 506 via a wired connection 516. As a non-limiting example, in a case of an automobile network, wired connection 516, as well as wired connection 518 from power slave 506 to power slave 508, may be wires in a wiring harness of an automobile.

In this embodiment, when a power manager of a physical layer device (e.g., similar to power management logic 110 of physical layer device 102) wakes up the physical layer device and its associated node in response to detecting a wakeup signal asserted at an input, then in response to waking up the power manager asserts a wakeup signal at an output thereof which is coupled to an input of another power slave in the daisy chain and so on until all power slaves are awake.

In the example contemplated by FIG. 5, power slave 504, power slave 506 and power slave 508 are in a sleep mode and are in a daisy chain configuration as described above. Power master 502 asserts wakeup signal 512 at power slave 504. Upon wakeup, power slave 504 asserts wakeup signal 514 at power slave 506 over wired connection 516. While not illustrated in FIG. 5, upon wakeup, power slave 506 will assert a wakeup signal at power slave 508 over wired connection 518. It should be generally understood that connections between power slaves 504, 506 and 508 may be configured for unidirectional communication, and configured for bi-directional communication and able to carry wakeup signals from power slave 506 to power slave 504 and from power slave 508 to power slave 506, depending on a particular implementation.

In some embodiments, each wired connection 516, 518 and 526 may represent connections for bi-directional communication among power slaves 504, 506 and 508. In some embodiments, communication at network 500 may be configured to facilitate wakeup of power slave 504, 506 and 508 in any order.

In one embodiment, to facilitate configuring a wakeup order in a daisy chained configuration, power slaves 504, 506 and 508 may each include one or more outputs and inputs for operable connection via wired connections 516, 518 and 526 to a corresponding input or output of one or more other power slaves. Each such connection may be enabled/disabled for wakeup signal communication in accordance with embodiments described herein.

In another embodiment, to facilitate configuring a wakeup order in a daisy chained configuration, power slaves 504, 506 and 508 may each be operably coupled to a bus (e.g., network 500 may include a bus that includes, or is connected to, wired connections 516, 518 and 526—such a bus is not specifically shown in FIG. 5) that is separate from shared bus 510, and which supports addressing to enable/disable sending and receiving wakeup signals communicated among the power slaves 504, 506 and 508 in any order (e.g., wakeup signal 514 and more generally, wakeup signals 138 of FIG. 1, without limitation). As a non-limiting example of configuring a wakeup order, each of power slave 504, 506 and 508 may be pre-configured to send a wakeup signal 138 to a power slave associated with a specific address. As another non-limiting example of configuring a wakeup order, power master 502 may include a message in wakeup signal 512, and the message may include addresses and wakeup order information that a power slave 504, 506 and/or 508 may use to determine and send a wakeup signal to the next power slave defined in the wakeup order.

As non-limiting examples, configuring enabling/disabling the order of communication according to one or more embodiments may be performed by power master 502, a higher order power master (not shown), or a system architect when network 500 is deployed.

In a use case for networks and networks segments in accordance with the embodiment shown in FIG. 5, power master 502 may wake up power slave devices in a specific order. In one embodiment of a wakeup operation contemplated by FIG. 5, the wakeup order is power slave 504, power slave 506, and power slave 508. In another contemplated operation, power master 502 may first assert a wakeup signal at power slave 506 via wired connection 522, which upon wakeup asserts a wakeup signal at power slave 508 via wired connection 518, and which upon wakeup asserts a wakeup signal at power slave 504 (via wired connection 526). Dotted communication connections from power master 502 to power slave 506 and power slave 508 are shown to illustrate that in some embodiments, power master 502 may be configured to choose a wakeup sequence for power slaves 504, 506, and 508 that starts with a wakeup signal to power slave 506 or 508, as a non-limiting example, based on application requirements for a multidrop or mixed network where a specific application may require or prefer a specific order for nodes to be reset.

Figure 6:
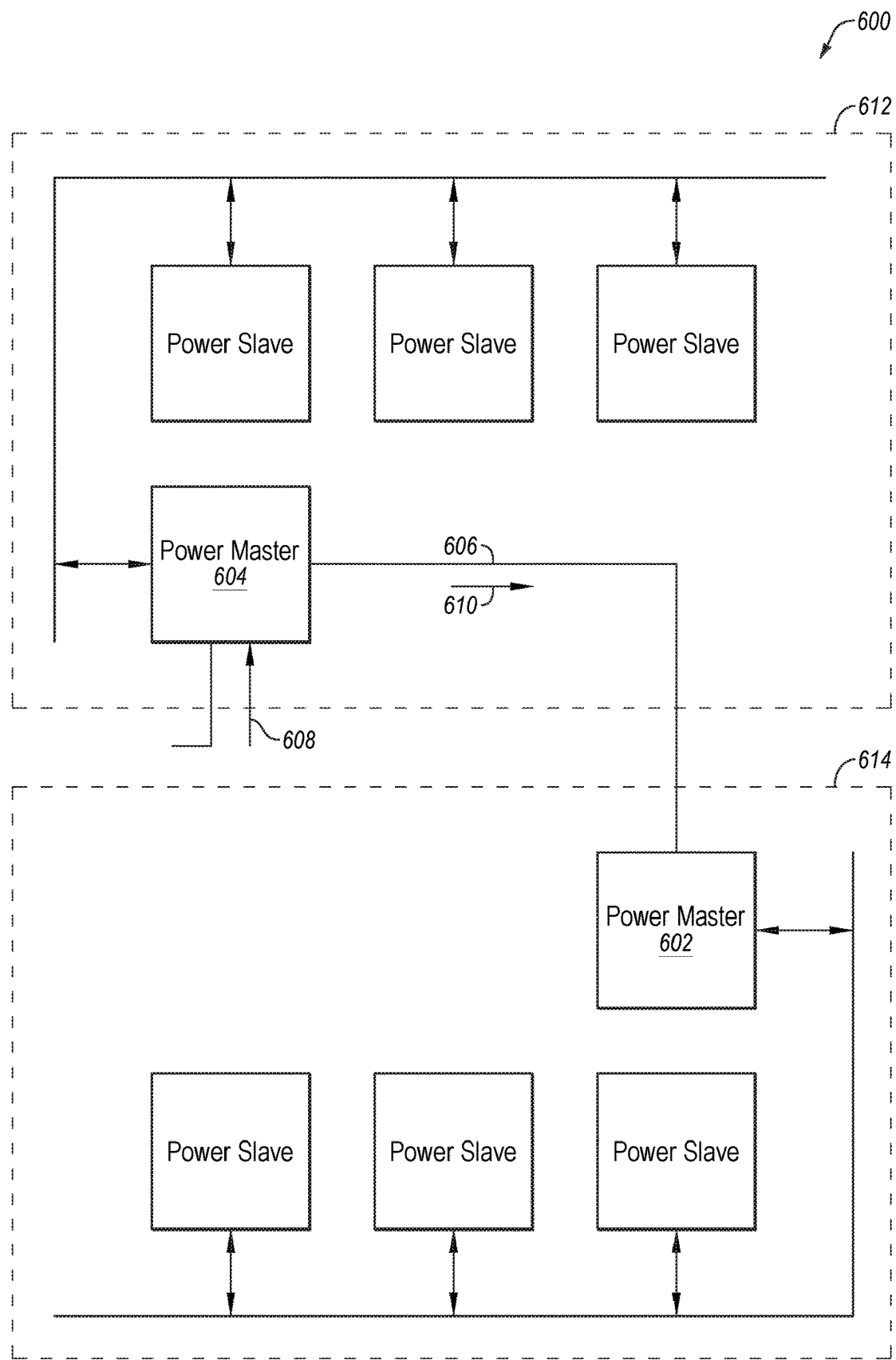
FIG. 6 illustrates a mixed daisy chained network in accordance with one or more embodiments.

FIG. 6 shows an embodiment of a mixed network 600 where network 612 and network 614 are daisy chained. In the embodiment shown in FIG. 6, the power master 604 of network 612 and power master 602 of network 614 include physical layer devices 102 of FIG. 1, configured for a daisy chain implementation.

In a contemplated operation, power master 604 of network 612 wakes up the power slaves of network 612 by asserting a wakeup signal or setting an activity level on a shared bus, in accordance with disclosed embodiments, in response to wakeup signal 608, received, as a non-limiting example, from another network or a higher level power master.

Link 606 provides a communication path between power master 604 and power master 602, and may include one more of a bus and wired connections between power master 604 and power master 602.

Power master 604 asserts wakeup signal 610 at power master 602 using link 606. In response to wake up wakeup signal 610 being asserted, power master 602 wakes up power slaves of network 614 by asserting a wakeup signal or setting activity levels on a shared bus, in accordance with disclosed embodiments. If another network that is part of the daisy chain together with network 612 and network 614 has not received a wakeup signal, then power master 602 may assert a wakeup signal for the power master of that network, and so on.

Figure 7:
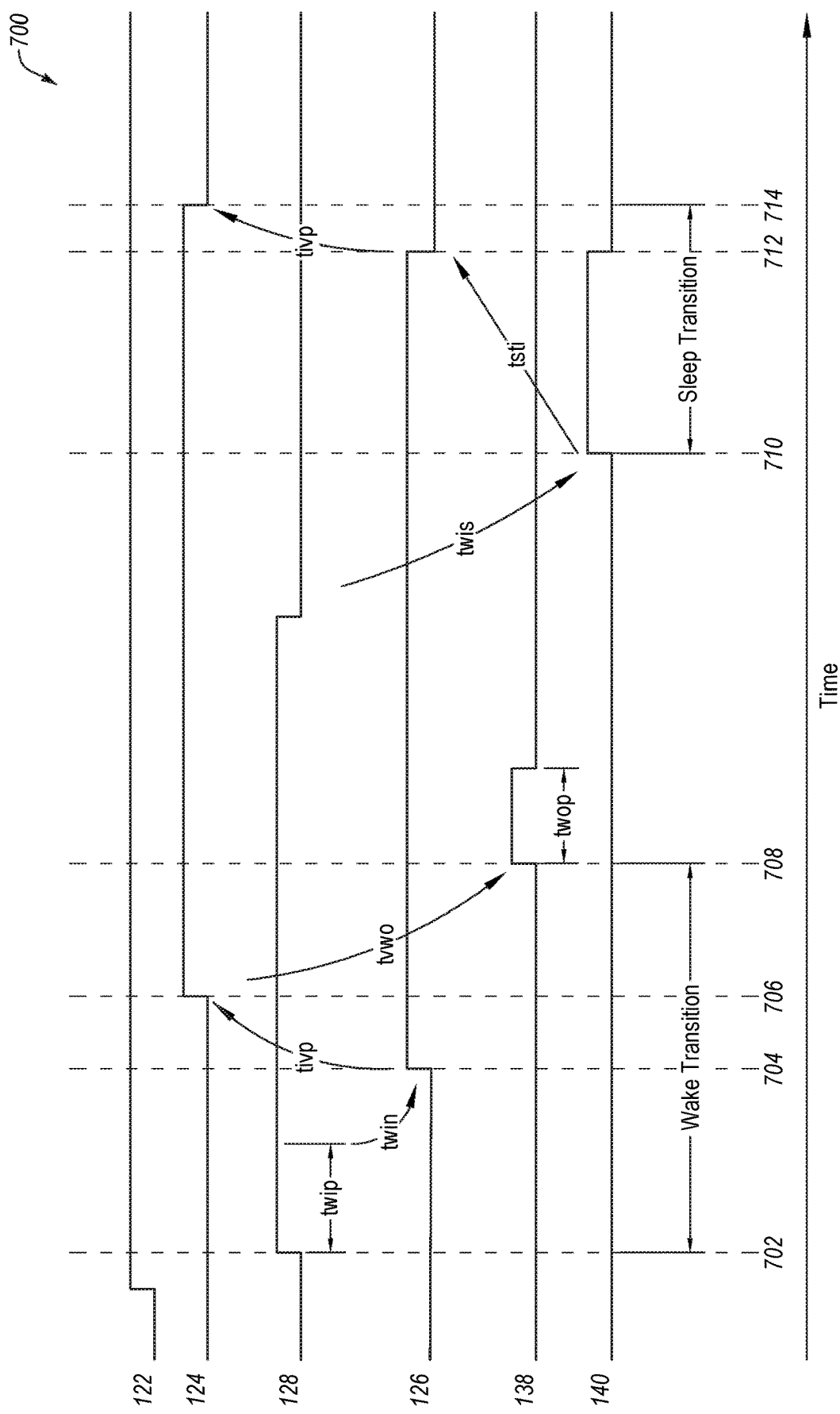
FIG. 7 illustrates a timing diagram for a first contemplated operation in accordance with one or more embodiments.

FIG. 7 shows a timing diagram 700 for a contemplated operation of station 100, and more specifically network segment 146, in accordance with one or more embodiments. Signals in timing diagram 700 correspond to signals shown in FIG. 1, in particular, uninterrupted power 122, main power 124, enablement signal 126, wakeup signal 128, optional wakeup signal 138, and sleep control signal 140.

Among the signals shown in FIG. 7 are signals associated with a contemplated WAKE transition (i.e., associated with entering a wake mode). At time 702 wakeup signal 128 is asserted at an input of physical layer device 102. In response to detection of a valid wakeup signal 128, at time 704 power management logic 110 asserts enablement signal 126. Wakeup signal 128 may be detected, as a non-limiting example, by sensing circuitry 114 of FIG. 1 which, in response, notifies power management logic 110 of valid wakeup signal 128. Notably, uninterrupted power 122 supplies elements of uninterrupted power domain 108, such as power management logic 110, energy detection circuitry 112 and sensing circuitry 114, without limitation.

In some embodiments, power management logic 110 and/or sensing circuitry 114 may be configured to detect a valid wakeup signal in response to detecting that wakeup signal 128 remains asserted for a specified period of time (or at least a specified period of time) that corresponds to a valid wakeup signal (in FIG. 7, a time corresponding to twip). By specifying a minimum period of time for a valid wakeup signal, a network segment will not exit a sleep mode in response to some transient signals detected at an input of a physical layer device. In some embodiments, there may be some delay between when valid wakeup signal 128 is detected and enablement signal 126 is asserted at time 704, shown as time period twin in FIG. 7.

In response to assertion of enablement signal 126, at time 706 main power 124 is switched on and supplied to elements of the network segment, such as main power domain 104 of physical layer device 102 and/or station controller 116, without limitation. In some embodiments, there may be a delay between when enablement signal 126 is asserted at time 704 and when main power 124 is switched on and supplied, shown as time period tivp in FIG. 7.

After main power 124 is switched on, at time 708 wakeup signal 138 is asserted by core logic 106 to generate a valid wakeup signal for a next network segment in a daisy chain. In some embodiments there may be a delay between when main power 124 is switched on at time 706 and when wakeup signal 138 is asserted at time 708, shown as time period tvwo in FIG. 7.

As discussed above, in some embodiments a valid wakeup signal may be detected in response to a wakeup signal being asserted for some period of time that has been pre-specified to correspond to a valid wakeup signal. So, core logic 106 may be configured to assert wakeup signal 138 for a period of time tvwo corresponding to the pre-specified period of time used by the next network segment in the daisy chain to detect a valid wakeup signal.

Also shown in FIG. 7 are signals associated with a contemplated SLEEP transition (i.e., associated with entering a sleep mode) in accordance with one or more embodiments. At time 710, a control bit of a sleep control register is set for controlling entering/exiting a sleep mode. In the contemplated operation shown in FIG. 7, the sleep control signal 140 is asserted (i.e., a control bit is set for a sleep control register) in response to wakeup signal 128 being de-asserted for a pre-specified period of time twis (i.e., a time-out condition).

As non-limiting examples, a time-out condition may be that a bus has been inactive for a specified period of time or that no valid wakeup signal has been detected for a specified period of time. In some embodiments, it may be desirable to prevent bus activity timeout by one or more network segments of a network. A power master may be configured to periodically assert, at a multidrop bus, a signal configured to represent valid bus activity, which is detectable as valid bus activity by various network segments in the network.

At time 712, power management logic 110 de-asserts enablement signal 126 in response to sleep control signal 140 being asserted for a period of time tsti. At time 714, main power 124 is switched off. In some embodiments there may be a delay from when enablement signal 126 is de-asserted and main power 125 is switched off, in FIG. 7 shown as time period tivp.

Notably, after main power 124 is switched off at time 714, uninterrupted power 122 remains on and supplies elements of uninterrupted power domain 108.

Figure 8:
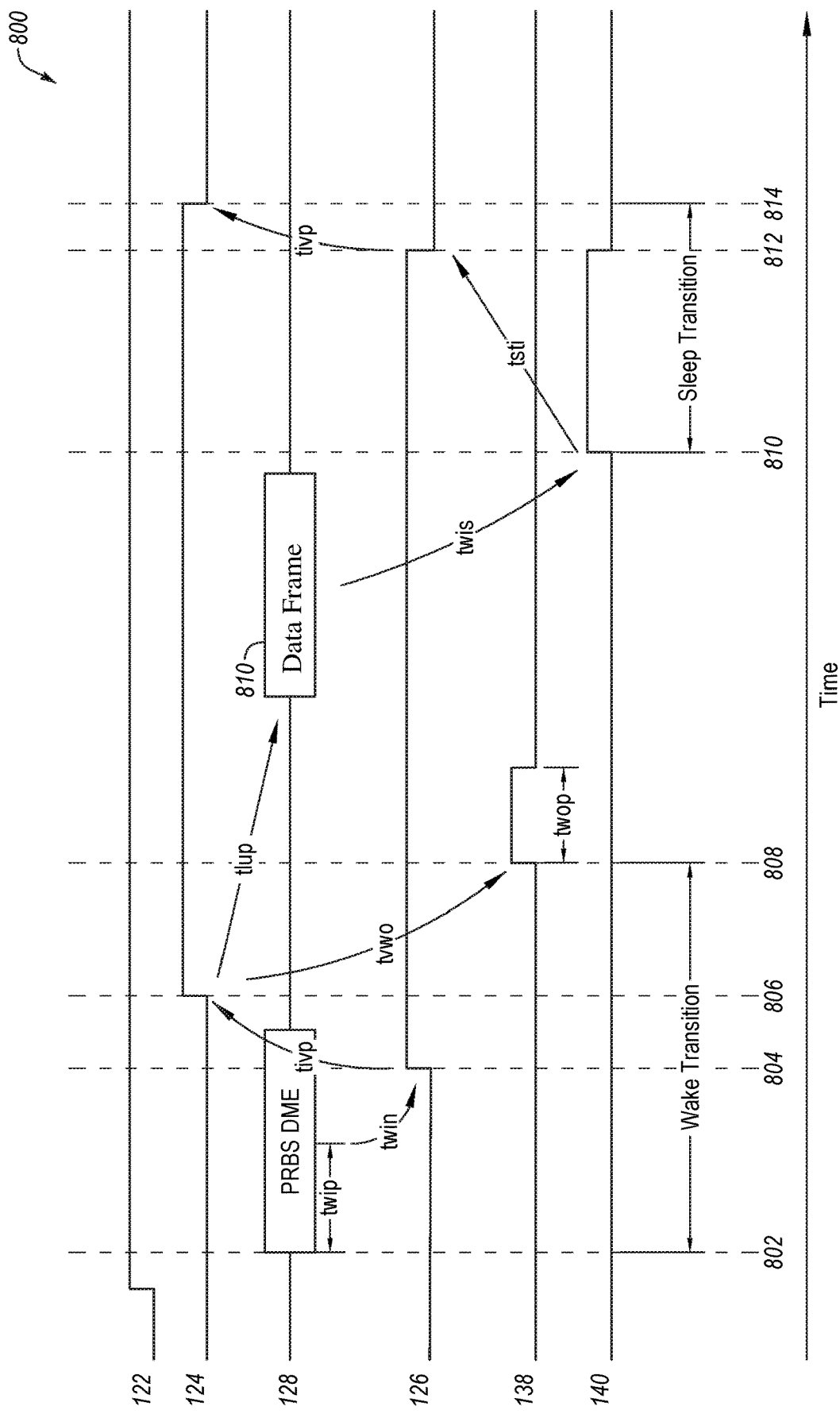
FIG. 8 illustrates a timing diagram for a second contemplated operation in accordance with one or more embodiments.

FIG. 8 shows a timing diagram 800 for a contemplated operation of network station 100 in accordance with one or more embodiments. Signals in timing diagram 800 correspond to signals shown in FIG. 1, in particular, uninterrupted power 122, main power 124, enablement signal 126, bus activity 136, optional wakeup signal 138, and sleep control signal 140. The discussion of time periods twip, twin, tivp, tvwo, twop, tsti and tivp in FIG. 7 applies to the similarly labeled time periods in FIG. 8.

Among the signals shown in FIG. 8 are signals associated with a WAKE transition (i.e., entering a wake mode) in accordance with one or more embodiments. At time 802, bus activity 136 is detected in response to a data frame (here, Pseudorandom Binary Sequence (PRBS) in a Differential Manchester Encoded (DME) frame) at shared bus 134. In response to bus activity 136, at time 804 power management logic 110 asserts enablement signal 126, and in response to assertion of enablement signal 126, at time 806 main power 124 is switched on and supplied to elements of the network segment, such as main power domain 104 of physical layer device 102 and/or station controller 116, without limitation.

In one embodiment, power management logic 110 and/or energy detection circuitry 112 may be configured to detect valid activity at shared bus 134 in response to detecting that bus activity 136 remains active for a specified period of time, and in FIG. 8, the specified period of time is the time period twip. As a non-limiting example, time period twip may correspond to a length of a data frame, a length of a control frame, or a time understood not to correspond to noise on a bus. By specifying a period of time for valid activity, a network segment will not exit a sleep mode in response to some transient signals on shared bus 134.

After main power 124 is switched on at time 806, wakeup signal 138 is asserted by core logic 106 at time 808 to generate a valid wakeup signal for a next network segment in a daisy chain, here, a signal that has a period twop.

Notably, when data frame 810 arrives, main power domain 104 is operating normally and able to receive the data frame.

Also shown in FIG. 8 are signals for a contemplated SLEEP transition (i.e., entering of a sleep mode) in accordance with one or more embodiments. At time 810, a control bit of a control register is set for controlling entering/exiting a sleep mode. As non-limiting examples, the control bit may be set by core logic 106 or an inactivity detection logic of power management logic 110 configured to detect a time-out condition. As non-limiting examples, a time-out condition may be that a bus has been inactive for a specified period of time or that no valid wakeup signal has been detected for a specified period of time.

At time 812, power management logic 110 de-asserts enablement signal 126 in response to sleep control signal 140 being asserted (i.e., a sleep control bit being set at a sleep control register). At time 814, main power 124 is switched off. Notably, after main power 124 is switched off at time 814, uninterrupted power 122 remains on and supplies elements of uninterrupted power domain 108.

Figure 9:
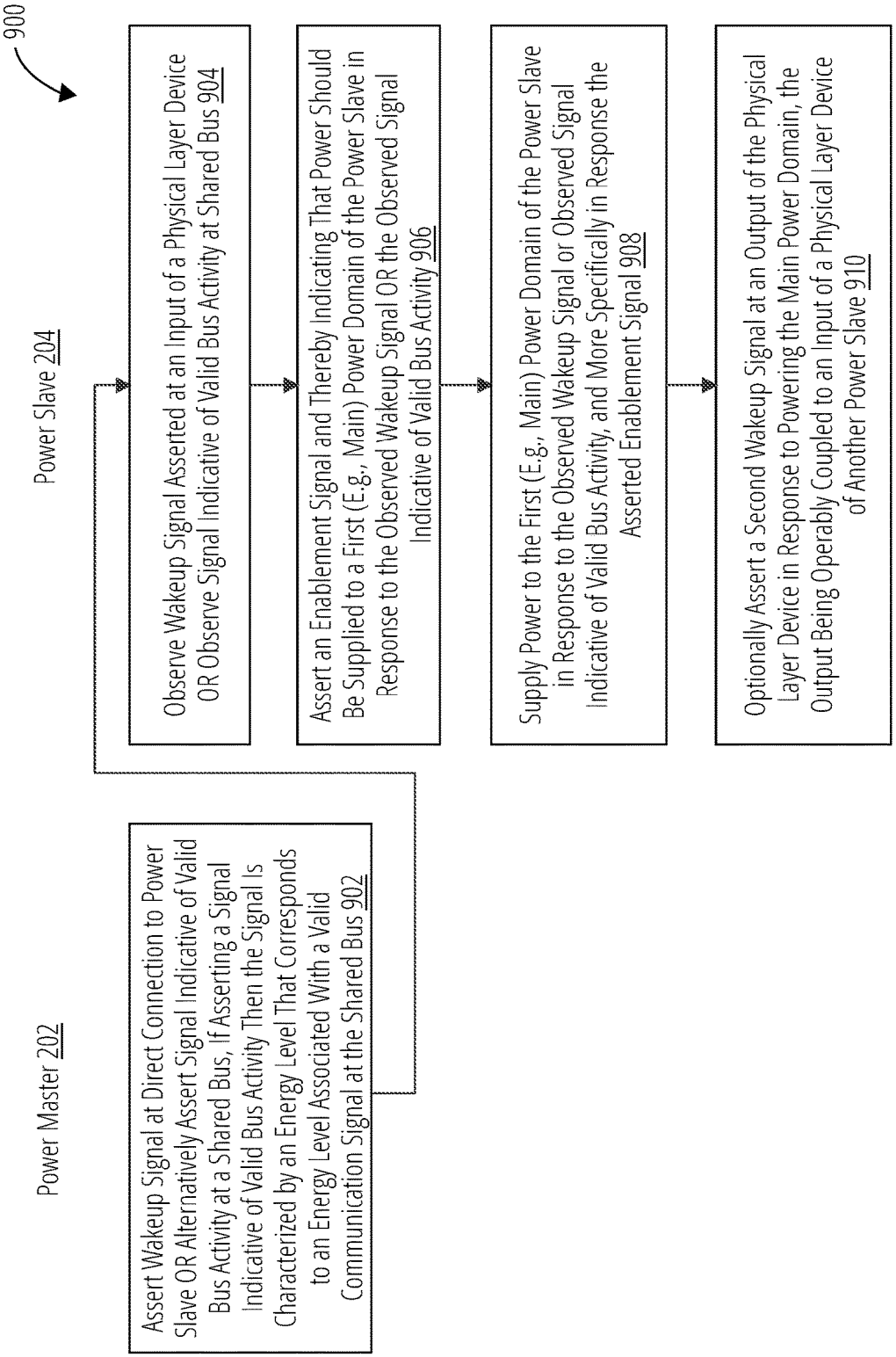
FIG. 9 illustrates a swim lane diagram of a wake transition process in accordance with one or more embodiments.

FIG. 9 shows a swim lane diagram of a wake transition process 900 in accordance with one or more embodiments.

In operation 902, process 900 asserts a wakeup signal (e.g., asserted by power master 202) at a direct connection to a power slave (e.g., power slave 204) or, in the alternative, asserts a signal indicative of valid bus activity at a shared bus (e.g., asserted by power master 202). In one embodiment, if a signal indicative of valid bus activity then the signal is characterized by an energy level that corresponds to an energy level associated with a valid communication signal (e.g., an energy level of an Ethernet data frame, without limitation).

In operation 904, process 900 observes (e.g., observed by power slave 204) a wakeup signal at an input of a physical layer device of power slave 204, or alternatively observes (e.g., observed by power slave 204) a signal indicative of valid bus activity at the shared bus.

In operation 906, process 900 asserts an enablement signal (e.g., by power slave 204) thereby indicating that power should be supplied to a first (e.g., main) power domain of a power slave in response to the observed wakeup signal or alternatively in response to the observed signal indicative of valid bus activity.

In operation 908, process 900 supplies power to the first (e.g., main) power domain of the power slave 204 in response to the observed wakeup signal or, alternatively, in response to the observed signal indicative of the valid bus activity. More specifically, power is supplied to the first (e.g., main) power domain of the power slave 204 in response to the enablement signal asserted in operation 906.

In operation 910, process 900 optionally asserts a second wakeup signal (e.g., asserted by power slave 204) at an output of the physical layer device of power slave 204 in response to supplying power to the main power domain. The output is operably coupled to an input of a physical layer device of another power slave, so the wakeup signal asserted to the output is asserted at the input of the other physical layer device of the other power slave.

Figure 10:
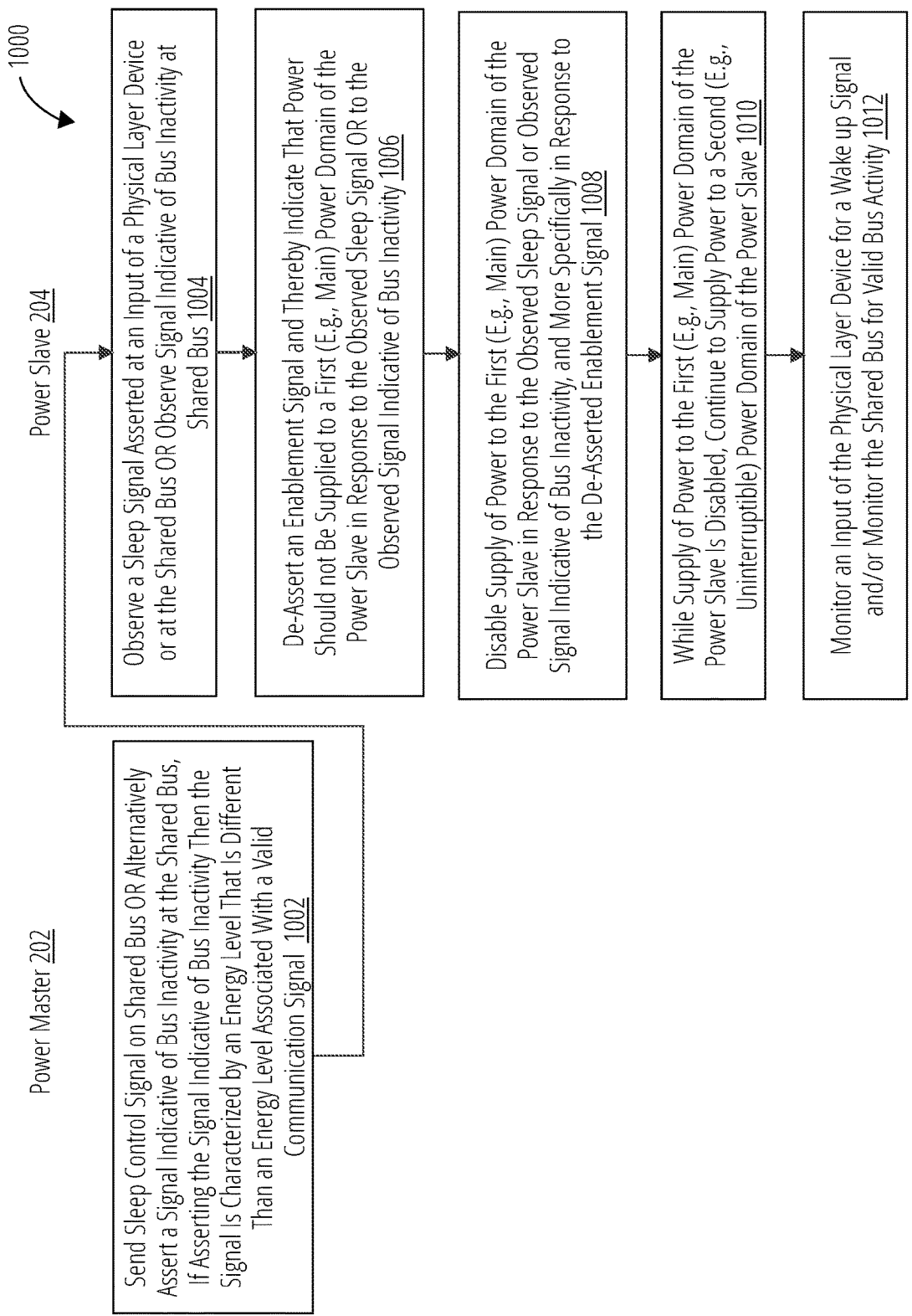
FIG. 10 illustrates a swim lane diagram of a sleep transition process in accordance with one or more embodiments.

FIG. 10 shows a swim lane diagram of a sleep transition process 1000 in accordance with one or more embodiments.

In operation 1002, process 1000 asserts a sleep signal (e.g., asserted by power master 202) at a shared bus or at a direct connection to a power slave (e.g., to power slave 204), or alternatively asserts a signal (e.g., asserted by power master 202) indicative of bus inactivity at the shared bus. In one embodiment, if asserting the signal indicative of bus inactivity then the signal is characterized by an energy level that is different than an energy level associated with a valid communication signal (e.g., different than an Ethernet signal, without limitation).

In operation 1004, process 1000 observes (e.g., observed by power slave 204) the asserted sleep signal at an input of a physical layer device of the power slave 204 or at the shared bus, or alternatively observes (e.g., observed by the power slave 204) a signal indicative of bus inactivity at the shared bus.

In operation 1006, process 1000 de-asserts an enablement signal (e.g., de-asserted by power slave 204) thereby indicating that power should not be supplied to a first (e.g., main) power domain of the power slave in response to the observed sleep signal, or alternatively in response to the observed bus inactivity.

In operation 1008, process 1000 disables supply of power (e.g., turns off switch 118 for conveying main power 124 in FIG. 1, without limitation) to the first (e.g., main) power domain of power slave 204 in response to the observed sleep signal or, alternatively, in response to the observed bus inactivity. More specifically, process 1000 disables supply of power to the first (e.g., main) power domain of the power slave 204 in response to the de-asserted enablement signal.

In operation 1010, process 1000, while supply of power to the first (e.g., main) power domain of the power slave is disabled, continues to supply power to a second (e.g., uninterruptible) power domain of the power slave 204 (e.g., uninterruptible power 122 supplied by power supply 120 in FIG. 1, without limitation).

In operation 1012, process 1000 monitors (e.g., monitored by circuitry associated with the second power domain of power slave 204) an input of the physical layer device of the power slave 204 for a wakeup signal and/or monitors the shared bus for valid bus activity.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," without limitation).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: A physical layer device for a network segment of a multi-drop network, comprising: a core logic associated with an interruptible power domain, the core logic configured to perform one or more operations for interfacing with a shared bus; and a power management logic associated with an uninterruptable power domain, the power management logic configured to enable and disable supply of power to the interruptible power domain.

Embodiment 2: The physical layer device according to Embodiment 1, further comprising: a sensing circuitry configured to detect a wakeup signal asserted at an input of the physical layer device, the power management logic configured to enable the supply of power to the interruptible power domain responsive to detection of the detected asserted wakeup signal by said sensing circuitry.

Embodiment 3: The physical layer device according to any of Embodiments 1 and 2, further comprising: an energy detection circuitry configured to detect bus activity, the power management logic configured to enable the supply of power to interruptible power domain responsive to detection by said energy detection circuitry of a valid bus activity.

Embodiment 4: The physical layer device according to any of Embodiments 1 through 3, wherein the power management logic is configured to enable the supply of power to the interruptible power domain in response to one or more of: a valid wakeup signal; and a valid bus activity.

Embodiment 5: The physical layer device according to any of Embodiments 1 through 4, wherein the power management logic is configured to disable the supply of power to the interruptible power domain responsive to one or more of: a sleep control signal; an inactive input assigned to receive a wakeup signal; and an inactive bus.

Embodiment 6: The physical layer device according to any of Embodiments 1 through 5, wherein the core logic is configured to assert a wakeup signal at an output of the physical layer device in response to waking up from a sleep mode.

Embodiment 7: A system, comprising: a first station controller; and a first physical layer device, the physical layer device configured to interface the first station controller with a shared bus of a network segment, wherein the first physical layer device is configured to enable and disable supply of power to one or more of the first station controller and an interruptible power domain of the physical layer device.

Embodiment 8: The system according to Embodiment 7 wherein the physical layer device comprises: a power management logic associated with an uninterruptable power domain of the first physical layer device, the power management logic configured to enable and disable the supply of the power to the first station controller.

Embodiment 9: The system according to any of Embodiments 7 and 8, wherein the physical layer device comprises: a core logic associated with the interruptible power domain of the first physical layer device.

Embodiment 10: The system according to any of Embodiments 7 through 9, wherein the power management logic is configured to disable the supply of power to the first station controller responsive to a sleep control signal provided by the core logic.

Embodiment 11: The system according to any of Embodiments 7 through 10, further comprising a control bus operatively coupling the first physical layer device and the first station controller, wherein the core logic is configured to provide the sleep control signal to the power management logic via the control bus.

Embodiment 12: The system according to any of Embodiments 7 through 11, further comprising equipment operatively coupled to a network by the first network segment.

Embodiment 13: The system according to any of Embodiments 7 through 12, further comprising: a switch configured to provide an interruptible path for supplying power to the equipment.

Embodiment 14: The system according to any of Embodiments 7 through 13, further comprising: a power master configured to generate power control signals for a network, wherein the power master is configured to selectively reset stations of a network segment of the network by instructing respective station controllers of the stations to enter a sleep mode.

Embodiment 15: The system according to any of Embodiments 7 through 14, further comprising: a power master configured to generate power control signal for a network, wherein the power master is configured to force stations of a network segment to enter a sleep mode by asserting a power control signal at the shared bus, the power control signal exhibiting an energy level different than an energy level associated with communication messages conveyed over the network segment.

Embodiment 16: The system of Embodiments 7 through 15, further comprising: a second station controller; and a second physical layer device of the first network segment, wherein the second physical layer device is configured to enable supply of power to the second station controller responsive to a wakeup signal received from the first physical layer device.

Embodiment 17: A method, comprising: disabling supply of power to a first power domain of a power slave in response to: receiving a sleep control signal; or observing a signal indicative of bus inactivity at a shared bus; and continuing to supply power to a second power domain of the power slave while the supply of power to the main power domain of the power slave is disabled.

Embodiment 18: The method according to embodiment 17, wherein disabling the supply of power to the first power domain of the power slave in response to the observed sleep control signal or the observed signal indicative of bus inactivity at the shared bus comprises: de-asserting an enablement signal thereby indicating that power should not be supplied to the first power domain of the power slave responsive to: the observed sleep control signal; or the observed signal indicative of bus inactivity at the shared bus.

Embodiment 19: The method according to any of Embodiments 17 and 18, wherein the observing the signal indicative of bus inactivity comprises observing an energy level of the signal and determining that the energy level is different than an energy level associated with a valid communication signal.

Embodiment 20: The method according to any of Embodiments 17 through 19, further comprising: supplying power to the first power domain of the power slave responsive to: observing a wakeup signal at an input of a physical layer device of the power slave; or observing a signal indicative of valid bus activity at the shared bus.

Embodiment 21: The method according to any of Embodiments 17 through 20, further comprising: asserting an enablement signal thereby indicating that power should be supplied to the first power domain of the power slave responsive to: the observed wakeup signal; or the observed signal indicative of valid bus activity at the shared bus; and starting the supplying of the power to the first power domain of the power slave responsive to the asserted enablement signal.

Embodiment 22: The method according to any of Embodiments 17 through 21, further comprising: asserting a second wakeup signal at an output of the physical layer device in response to supplying power to the main power domain, the output being operably coupled to an input of another physical layer device.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
    transmission/reception circuitry associated with an interruptible power domain;
    a core logic associated with the interruptible power domain to perform one or more operations of a physical layer device for interfacing with a shared bus; and
    a power management logic associated with an uninterruptable power domain to enable and disable supply of power to the interruptible power domain,
    wherein the transmission/reception circuitry and the core logic respectively exhibit states responsive to a state of supply of power to the interruptible power domain, the states including an unpowered state responsive to a disabled supply of power to the interruptible power domain and a powered states responsive to an enabled supply of power to the interruptible power domain.

2. The apparatus of claim 1, comprising:
    an input; and
    a sensing circuitry to detect a wakeup signal asserted at the input, the power management logic to enable the supply of power to the interruptible power domain responsive to detection of the detected asserted wakeup signal by said sensing circuitry.

3. The apparatus of claim 1, wherein the power management logic to enable the supply of power to the interruptible power domain in response to one or more of:
    a valid wakeup signal; and
    a valid bus activity.

4. The apparatus of claim 1, wherein the power management logic to disable the supply of power to the interruptible power domain responsive to one or more of:
    a sleep control signal;
    an inactive input assigned to receive a wakeup signal; and
    an inactive bus.

5. The apparatus of claim 1, wherein the core logic to assert a wakeup signal at an output of the physical layer device in response to waking up from a sleep mode.

6. The apparatus of claim 2, comprising:
an energy detection circuitry to detect bus activity, the power management logic to enable the supply of power to the interruptible power domain responsive to detection by said energy detection circuitry of a valid bus activity.

7. A system, comprising:
a first station controller; and
a first physical layer device to interface the first station controller with a shared bus of a network segment and to enable and disable a supply of power to the first station controller and to an interruptible power domain of the first physical layer device.

8. The system of claim 7, wherein the first physical layer device comprises:
a power management logic associated with an uninterruptable power domain of the first physical layer device to enable and disable the supply of the power to the first station controller.

9. The system of claim 7, comprising equipment, the network segment to operatively couple the equipment to a network.

10. The system of claim 7, comprising:
a second station controller; and
a second physical layer device of the network segment to enable supply of power to the second station controller responsive to a wakeup signal received from the first physical layer device.

11. The system of claim 8, wherein the first physical layer device comprises:
a core logic associated with the interruptible power domain of the first physical layer device.

12. The system of claim 9, comprising:
a switch to provide an interruptible path for supplying power to the equipment.

13. The system of claim 11, wherein the power management logic to disable the supply of power to the first station controller responsive to a sleep control signal provided by the core logic.

14. The system of claim 12, comprising:
a power master to generate power control signals for the network, the power control signals comprising instructions to selectively reset stations of respective network segments of the network.

15. The system of claim 12, comprising:
a power master to generate power control signals for the network, the power control signals comprising instructions to force stations of respective network segments of the network to enter a sleep mode.

16. The system of claim 13, comprising:
a control bus, the first physical layer device and the first station controller operatively coupled via the control bus to
provide the sleep control signal to the power management logic.

17. The system of claim 14, wherein the instructions to selectively reset stations of the respective network segments of the network comprising instructions to enter a sleep mode.

18. The system of claim 15, wherein the instructions comprise an assertion of a power control signal at the shared bus.

19. The system of claim 18, wherein the assertion of the power control signal exhibits an energy level different than an energy level associated with communication messages conveyed over the network segment.

20. A method, comprising:
disabling a supply of power to a first power domain of a station in response to an asserted signal, the signal asserted by a physical layer device of the station responsive to:
receiving a sleep control signal; or
observing a signal indicative of bus inactivity at a shared bus,
wherein the first power domain of the station includes:
a transmission/reception circuitry of the physical layer device, and
a core logic of the physical layer device,
wherein the transmission/reception circuitry and the core logic respectively exhibit states responsive to a state of supply of power to the first power domain, the states including an unpowered state responsive to a disabled supply of power to the first power domain and a powered state responsive to an enabled supply of power to the first power domain; and
continuing to supply power to a second power domain of the station while the supply of power to the first power domain of the station is disabled.

21. The method of claim 20, wherein disabling the supply of power to the first power domain of the station in response to the received sleep control signal or the observed signal indicative of bus inactivity at the shared bus comprises:
de-asserting an enablement signal thereby indicating that power should not be supplied to the first power domain of the station responsive to:
the received sleep control signal; or
the observed signal indicative of bus inactivity at the shared bus.

22. The method of claim 20, wherein the observing the signal indicative of bus inactivity comprises observing an energy level of the signal and determining that the energy level is different than an energy level associated with a valid communication signal.

23. The method of claim 20, comprising:
supplying power to the first power domain of the station responsive to:
observing a wakeup signal at an input of the physical layer device of the station; or
observing a signal indicative of valid bus activity at the shared bus.

24. The method of claim 23, comprising:
asserting an enablement signal thereby indicating that power should be supplied to the first power domain of the station responsive to:
the observed wakeup signal; or
the observed signal indicative of valid bus activity at the shared bus; and
starting the supplying of the power to the first power domain of the station responsive to the asserted enablement signal.

25. The method of claim 23, comprising:
asserting a second wakeup signal at an output of the physical layer device in response to supplying power to the first power domain, the output being operably coupled to an input of another physical layer device.

* * * * *

UNITED STATES PATENT AND TRADEMARK OFFICE
CERTIFICATE OF CORRECTION

PATENT NO. : 11,775,045 B2
APPLICATION NO. : 16/781227
DATED : October 3, 2023
INVENTOR(S) : William T. Baggett and Venkatraman Iyer It is certified that error appears in the above-identified patent and that said Letters Patent is hereby corrected as shown below:

In the Specification
Column 1, Line 32, change "conductors—and" to --conductors - and--
Column 6, Line 56, change "turned 'off.'" to --turned 'off,'--
Column 10, Line 56, change "may be—thereby" to --may be – thereby--
Column 13, Line 17, change "and 526—such" to --and 526 – such--

Signed and Sealed this
Twenty-seventh Day of February, 2024

*Katherine Kelly Vidal*

Katherine Kelly Vidal
*Director of the United States Patent and Trademark Office*